US012763411B2

(12) United States Patent
Lim et al.

(10) Patent No.: US 12,763,411 B2
(45) Date of Patent: Oct. 13, 2026

(54) SECONDARY BATTERY HAVING VENT PORTION ON INSULATION FILM AND METHOD FOR MANUFACTURING THE SAME

(71) Applicant: LG Energy Solution, Ltd., Seoul (KR)

(72) Inventors: Hun-Hee Lim, Daejeon (KR); Sang-Hun Kim, Daejeon (KR); Min-Hyeong Kang, Daejeon (KR); Hyung-Kyun Yu, Daejeon (KR); Soo-Ji Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 685 days.

(21) Appl. No.: 18/028,915

(22) PCT Filed: Jan. 27, 2022

(86) PCT No.: PCT/KR2022/001526
§ 371 (c)(1),
(2) Date: Mar. 28, 2023

(87) PCT Pub. No.: WO2022/164241
PCT Pub. Date: Aug. 4, 2022

(65) Prior Publication Data

US 2023/0335838 A1 Oct. 19, 2023

(30) Foreign Application Priority Data

Jan. 27, 2021 (KR) ........................ 10-2021-0011775

(51) Int. Cl.
*H01M 50/184* (2021.01)
*H01M 50/172* (2021.01)
(Continued)

(52) U.S. Cl.
CPC ....... *H01M 50/184* (2021.01); *H01M 50/172* (2021.01); *H01M 50/186* (2021.01); *H01M 50/30* (2021.01)

(58) Field of Classification Search
CPC .. H01M 50/184; H01M 50/186; H01M 50/30; H01M 50/172
See application file for complete search history.

(56) References Cited

U.S. PATENT DOCUMENTS

2005/0214461 A1 9/2005 Desai et al.
2006/0099493 A1 * 5/2006 Nishimura ............ H01M 10/42 429/234

(Continued)

FOREIGN PATENT DOCUMENTS

CN 104137293 A 11/2014
CN 106067525 A 11/2016

(Continued)

OTHER PUBLICATIONS

EPO machine generated English translation of KR-20160037350-A (Year: 2016).*

(Continued)

*Primary Examiner* — Kimberly Wyluda
(74) *Attorney, Agent, or Firm* — Lerner David LLP

(57) ABSTRACT

Disclosed herein is a secondary battery with an electrode assembly including a positive electrode, a negative electrode and a separator interposed therebetween. A positive electrode tab may be connected electrically to a positive electrode lead and a negative electrode tab may be connected electrically to a negative electrode lead. The positive and negative electrode leads may be exposed to the outside through a sealing portion of a battery casing. A positive electrode insulation film and a negative electrode insulation film may be attached to a portion where each of the respective electrode leads contact the sealing portion. At (Continued)

least the positive electrode insulation film or the negative electrode insulation film may have a vent portion surface-treated with a non-adhesive material between the insulation film and the respective electrode lead at the portion where the electrode lead is attached.

8 Claims, 3 Drawing Sheets

(51) Int. Cl.

*H01M 50/186* (2021.01)

*H01M 50/30* (2021.01)

(56) References Cited

U.S. PATENT DOCUMENTS

| | | | | |
|---|---|---|---|---|
| 2010/0266881 | A1 | 10/2010 | You et al. | |
| 2014/0011060 | A1 | 1/2014 | Yang et al. | |
| 2016/0028068 | A1* | 1/2016 | Yang | H01M 50/178 429/61 |
| 2016/0315301 | A1 | 10/2016 | Kim et al. | |
| 2018/0114964 | A1 | 4/2018 | Kim et al. | |
| 2019/0326615 | A1 | 10/2019 | Kurihara | |
| 2019/0372083 | A1 | 12/2019 | Ryu et al. | |
| 2020/0331234 | A1 | 10/2020 | Wakizaka et al. | |
| 2024/0030561 | A1 | 1/2024 | Lim et al. | |

FOREIGN PATENT DOCUMENTS

| | | | | |
|---|---|---|---|---|
| CN | 109473572 | A | 3/2019 | |
| CN | 110391438 | A | 10/2019 | |
| CN | 110998912 | A | 4/2020 | |
| CN | 111490276 | A | 8/2020 | |
| CN | 115461928 | A | 12/2022 | |
| JP | 2001-229904 | A | 8/2001 | |
| JP | 2007531643 | A | 11/2007 | |
| JP | 2013187018 | A | 9/2013 | |
| JP | 2014212034 | A | 11/2014 | |
| JP | 2019192360 | A | 10/2019 | |
| KR | 20070074390 | A * | 7/2007 | H01M 50/572 |
| KR | 20080090769 | A | 10/2008 | |
| KR | 20080094602 | A | 10/2008 | |
| KR | 20140070751 | A | 6/2014 | |
| KR | 20160037350 | A * | 4/2016 | H01M 50/105 |
| KR | 20160126157 | A | 11/2016 | |
| KR | 20170027150 | A | 3/2017 | |
| KR | 20190135346 | A | 12/2019 | |
| KR | 20210004580 | A | 1/2021 | |

OTHER PUBLICATIONS

EPO machine generated English translation of KR-20070074390-A (Year: 2007).*

Search report from International Application No. PCT/KR2022/001526, mailed May 13, 2022.

Search Report dated Oct. 17, 2025 from the Office Action for Chinese Application No. 202280005656.5 issued Oct. 25, 2025, 3 pages.

Extended European Search Report including Written Opinion for Application No. 22746267.8 dated Nov. 6, 2024, 10 pages.

* cited by examiner

SECONDARY BATTERY HAVING VENT PORTION ON INSULATION FILM AND METHOD FOR MANUFACTURING THE SAME

CROSS-REFERENCE TO RELATED APPLICATIONS

The present application is a national phase entry under 35 U.S.C. § 371 of International Application No. PCT/KR2022/001526 filed on Jan. 27, 2022, which claims priority to Korean Patent Application No. 10-2021-0011775 filed on Jan. 27, 2021, in the Republic of Korea, the disclosures of which are hereby incorporated by reference in their entirety.

TECHNICAL FIELD

The present disclosure relates to a secondary battery having a vent portion formed on an insulation film and a method for manufacturing the same.

BACKGROUND ART

Due to the rapid increase in the use of fossil fuels, the demand for the use of alternative energy or clean energy is increasing, and the most actively studied field as a part thereof is the field of power generation and power storage using electrochemistry.

Currently, a typical example of electrochemical devices using electrochemical energy includes a secondary battery, and the area of the use of secondary batteries is gradually expanding.

Recently, as technical development and demand for mobile instruments, such as portable computers, cellular phones and cameras, have been increased, secondary batteries as energy sources have been increasingly in demand Particularly, lithium secondary batteries which show high charge/discharge characteristics and life characteristics and are eco-friendly have been studied intensively, and have been commercialized and used widely.

However, as the application spectrum of lithium secondary batteries has been expanded as mentioned above, there is a need for an increase in energy density. Therefore, such lithium secondary batteries cause an increase in gases generated inside of the secondary batteries due to such increased energy density.

Moreover, when water infiltrates into secondary batteries, side reactions occur, and thus the problems of degradation of the performance of secondary batteries and gas generation are accelerated undesirably.

Under these circumstances, the above-mentioned safety problem has been solved by forming a vent portion in a secondary battery so that the gases generated inside of the secondary battery may be released to the outside. However, when the secondary battery is vented, the life of the secondary battery is reduced significantly. Therefore, there is an imminent need for the solution of the above-mentioned problem.

DISCLOSURE

Technical Problem

The present disclosure is designed to solve the problems of the related art.

Particularly, the present disclosure is directed to providing a secondary battery having improved safety by structuralizing a gas discharge path efficiently through a simpler method to release gases to the outside efficiently, while minimizing water diffused from the outside, and a method for manufacturing the secondary battery.

Technical Solution

In one aspect of the present disclosure, there is provided a secondary battery which includes an electrode assembly including a positive electrode, a negative electrode and a separator interposed between the positive electrode and the negative electrode, and received in a battery casing together with an electrolyte,

- wherein the positive electrode includes a positive electrode tab, and the negative electrode includes a negative electrode tab,
- the positive electrode tab is connected electrically to a positive electrode lead, the negative electrode tab is connected electrically to a negative electrode lead, and the positive electrode lead and the negative electrode lead are exposed to the outside through a sealing portion of the battery casing,
- each of a positive electrode insulation film and a negative electrode insulation film is attached to a portion where each of the positive electrode lead and the negative electrode lead is in contact with the sealing portion of the battery casing, and
- at least one insulation film of the positive electrode insulation film and the negative electrode insulation film has a vent portion surface-treated with a non-adhesive material between the insulation film and the positive electrode lead or the negative electrode lead, at the portion where the positive electrode lead or the negative electrode lead is attached.

Herein, the vent portion may be a coating layer formed by transferring a non-adhesive material from a roll onto the insulation film through roll pressing.

The non-adhesive material may be a material cured after coating a polymer having a melting point of 220° C. or higher, or gelled ceramic particles, and particularly, may be a material cured after coating at least one polymer selected from the group consisting of a polyimide-based material, polytetrafluoroethylene and polymethyl pentene, or at least one ceramic particle selected from the group consisting of $SiO_2$, $TiO_2$, ZnO, CaO and BaO in a gelled state.

In addition, the vent portion has a planar shape selected from a circular shape, an oval shape and a polygonal shape.

Meanwhile, at least one electrode lead of the positive electrode lead and the negative electrode lead may include a metal substrate and a coating layer formed on the surface of the metal substrate.

In another aspect of the present disclosure, there is provided a method for manufacturing the secondary battery, including the steps of:

- (a) preparing at least one positive electrode and at least one negative electrode each having a structure including an electrode active material layer formed on a current collector having a tab formed in at least one side thereof;
- (b) interposing a separator between the positive electrode and the negative electrode;
- (c) transferring a non-adhesive material to at least one of a positive electrode insulation film and a negative electrode insulation film through a roll pressing process by using a roll including the non-adhesive material corresponding to the shape of a vent portion, thereby forming a vent portion; and (d) connecting the positive electrode lead electrically to the positive electrode tab and connecting the negative electrode lead electrically to the negative electrode tab, and attaching the positive electrode insulation film and the negative electrode insulation film to the positive electrode lead and the negative electrode lead, respectively, wherein the vent portion is interposed between the positive electrode lead and the portion to which the positive electrode insulation film is attached, between the negative electrode lead and the portion to which the negative electrode insulation film is attached, or both.

Herein, the non-adhesive material may be a material cured after coating a polymer having a melting point of 220° C. or higher, or gelled ceramic particles, and particularly, may be a material cured after coating at least one polymer selected from the group consisting of a polyimide-based material, polytetrafluoroethylene and polymethyl pentene, or at least one ceramic particle selected from the group consisting of $SiO_2$, $TiO_2$, ZnO, CaO and BaO in a gelled state.

In addition, the vent portion has a planar shape selected from a circular shape, an oval shape and a polygonal shape.

Advantageous Effects

According to an embodiment of the present disclosure, a gas discharge path may be formed on a lead portion by forming a vent portion on the insulation film attached to an electrode lead, thereby providing an increased effective value.

In addition, the vent film is formed through a simplified method of coating a non-adhesive material on the insulation film adhered with the electrode lead through a roll pressing process, and thus can be formed rapidly and efficiently.

BEST MODE

Figure 1A:
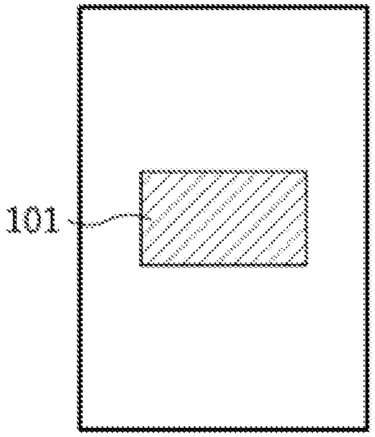
FIGS. 1(*a*)-1(*d*) are schematic views illustrating some embodiments of the shape of a vent portion formed on an insulation film according to an embodiment of the present disclosure.
Figure 1B:
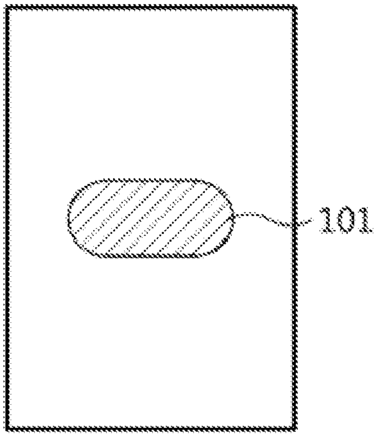
Figure 1C:
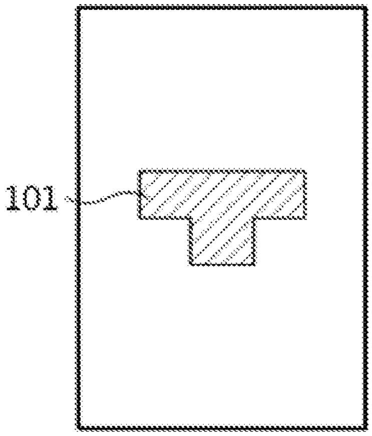
Figure 1D:
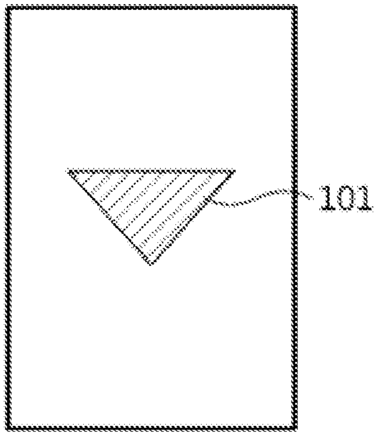

Hereinafter, preferred embodiments of the present disclosure will be described in detail with reference to the accompanying drawings.

Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

It will be understood that the terms "include", "is provided with" or "have" when used in this specification, refer to the presence of any stated features, numbers, steps, elements and/or combinations thereof, but do not preclude the addition of one or more other features, numbers, steps, elements and/or combinations thereof.

In one aspect of the present disclosure, there is provided a secondary battery which includes an electrode assembly including a positive electrode, a negative electrode and a separator interposed between the positive electrode and the negative electrode, and received in a battery casing together with an electrolyte, wherein the positive electrode includes a positive electrode tab, and the negative electrode includes a negative electrode tab, the positive electrode tab is connected electrically to a positive electrode lead, the negative electrode tab is connected electrically to a negative electrode lead, and the positive electrode lead and the negative electrode lead are exposed to the outside through a sealing portion of the battery casing, each of a positive electrode insulation film and a negative electrode insulation film is attached to a portion where each of the positive electrode lead and the negative electrode lead is in contact with the sealing portion of the battery casing, and at least one insulation film of the positive electrode insulation film and the negative electrode insulation film has a vent portion surface-treated with a non-adhesive material between the insulation film and the positive electrode lead or the negative electrode lead, at the portion where the positive electrode lead or the negative electrode lead is attached.

According to the related art, various methods have been developed to discharge gases generated inside of a secondary battery to the outside, when such gases are generated. For example, there have been attempts to ensure the safety of a secondary battery by discharging the gases generated inside of a secondary battery to the outside through the formation of a notch in a pouch, formation of a separate gas discharge member in a gap with a lead portion, or the like.

However, according to the above-mentioned methods, the secondary battery cannot be used any longer once it is vented. Therefore, the life of the secondary battery is reduced significantly, or a separate member is required additionally, and thus the methods cannot have an edge in price competitiveness.

On the contrary, according to the present disclosure, a vent portion is formed in an electrode lead portion through a simpler method, and thus it is possible to improve the life of the secondary battery significantly, while ensuring the safety of the secondary battery.

Particularly, the vent portion can be formed through a very simple and inexpensive process.

For example, the vent portion may be formed by using any method known to those skilled in the art with no particular limitation. For example, spin coating, blade coating, spray coating and ink jet printing processes may be used. Particularly, the vent portion may be a coating layer formed by transferring a non-adhesive material from a roll onto an insulation film through roll pressing.

The vent portion may be formed in a very simple manner by forming a coating layer of non-adhesive material on the insulation film adhered with the lead, and attaching the insulation film to the lead in such a manner that the coating layer may be interposed between the lead and the insulation film, in a significantly efficient manner in terms of process and cost.

Herein, the non-adhesive material refers to a material which is not adhered with the positive electrode lead or negative electrode lead subsequently. For example, the non-adhesive material may be a material cured after coating a polymer having a melting point of 220° C. or higher, or gelled ceramic particles, and particularly, may be a material cured after coating at least one polymer selected from the group consisting of a polyimide-based material, polytetrafluoroethylene and polymethyl pentene, or at least one ceramic particle selected from the group consisting of $SiO_2$, $TiO_2$, ZnO, CaO and BaO in a gelled state.

Herein, the non-adhesive material may be formed with a coating thickness of 30 nm to 1 mm.

When the coating thickness of the non-adhesive material satisfies the above-defined range, there is an advantage in terms of process, and it is possible to prevent a problem in which portions except the non-adhesive material are not sealed. Therefore, it is possible to easily prevent a problem of electrolyte leakage.

Herein, the vent portion may be formed with an area of 10-70%, particularly 20-50%, based on the total area where the positive electrode lead is attached to the positive electrode insulation film, or the negative electrode lead is attached to the negative electrode insulation film.

When the area of the vent portion satisfies the above-defined range, it is possible to prevent a sealability-related problem, such as electrolyte leakage, while ensuring a vent effect.

Meanwhile, the vent portion is not particularly limited in terms of its planar shape, and may have various forms, such as a circular shape, an oval shape and a polygonal shape, with the proviso that it may be formed with a pattern capable of preventing a problem, such as electrolyte leakage, and discharging gases efficiently.

FIGS. 1(*a*)-1(*d*) are schematic views illustrating some embodiments of the shape of a vent portion 101 on the insulation film 100.

FIG. 1(*a*) illustrates a rectangular vent portion, FIG. 1(*b*) illustrates an oval vent portion, FIG. 1(*c*) illustrates an irregularity-like polygonal vent portion, and FIG. 1(*d*) illustrates a triangular vent portion 101.

However, the shapes as shown in the drawings are for illustrative purposes only, and the scope of the present disclosure is not limited thereto.

Figure 2:
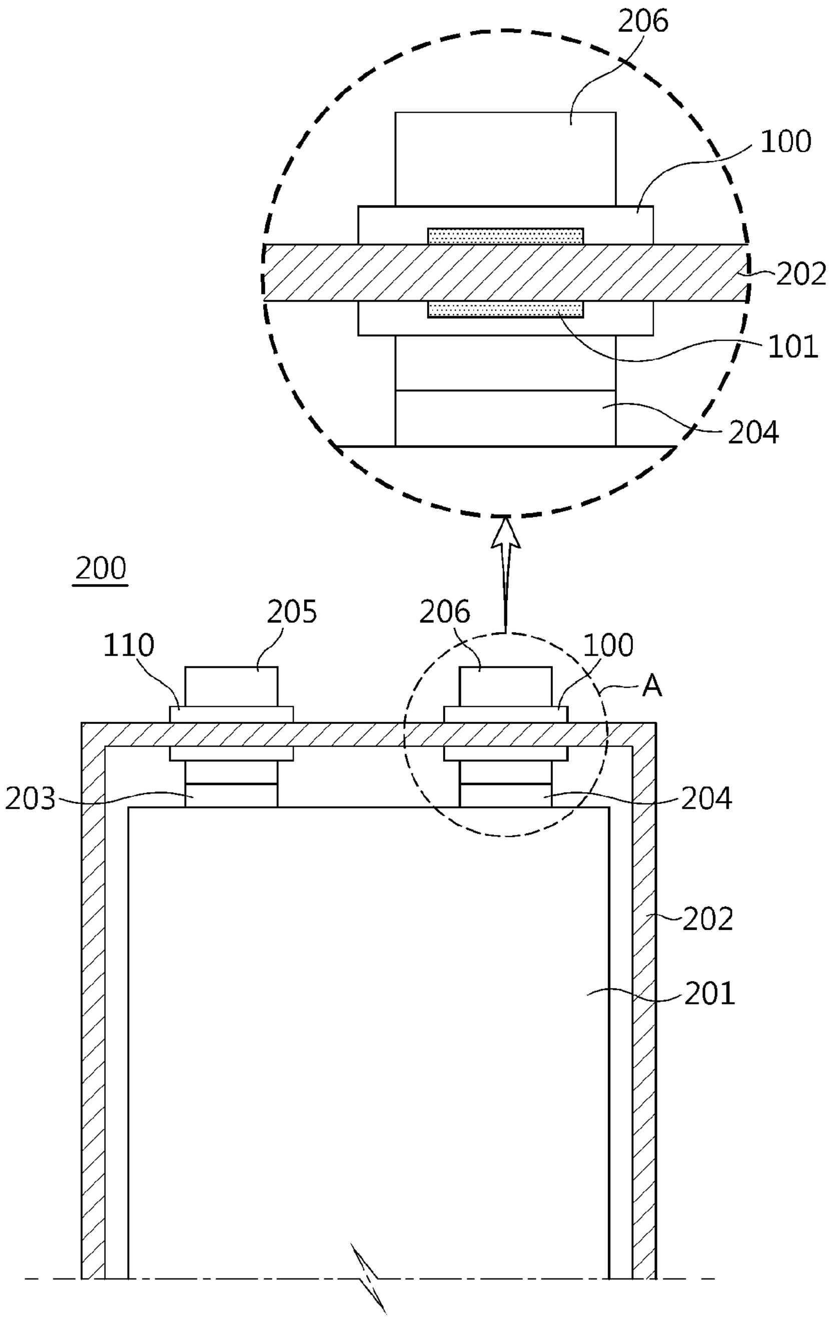
FIG. 2 is a schematic view illustrating the secondary battery according to another embodiment of the present disclosure.

FIG. 2 is a schematic view illustrating the secondary battery 200 according to an embodiment of the present disclosure.

Referring to FIG. 2, an electrode assembly 201 including a positive electrode, a negative electrode and a separator interposed between the positive electrode and the negative electrode is received in a battery casing 202 together with an electrolyte, wherein the positive electrode includes a positive electrode tab 203, the negative electrode includes a negative electrode tab 204, the positive electrode tab 203 is connected electrically to a positive electrode lead 205, the negative electrode tab 204 is connected electrically to a negative electrode lead 206, the positive electrode lead 205 and the negative electrode lead 206 are exposed to the outside through a sealing portion of the battery casing, each of a positive electrode insulation film 110 and a negative electrode insulation film 100 is attached to a portion where each of the positive electrode lead 205 and the negative electrode lead 206 is in contact with the sealing portion of the battery casing 202.

Herein, when the portion where the negative electrode insulation film 100 is attached to the negative electrode lead 206 is enlarged (A) and the structure thereof is reviewed, it can be seen that a vent portion 101 is formed partially at the portion where the negative electrode insulation film 100 is attached to the negative electrode lead 206.

Herein, the vent portion 101 is disposed between the negative electrode insulation film 100 and the negative electrode lead 206 and is not adhered with the negative electrode lead 206, and thus functions as a gas discharge path.

Although it is not shown in the drawing, a vent portion may be formed in the positive electrode insulation film 110, or may be formed in both of the positive electrode insulation film 110 and the negative electrode insulation film 100.

Meanwhile, the vent portion 101 may be formed with an area of 20-90%, particularly 30-80%, based on the area where the negative electrode lead 206 is in contact with the negative electrode insulation film 100.

When the area of the vent portion 101 satisfies the above-defined range, it is possible to ensure a sufficient area for the adhesion of the lead with the insulation film, while ensuring a vent effect, and thus to ensure sealability with ease.

In addition, the shape of the vent portion is the same as described hereinabove.

The positive electrode insulation film 110 and the negative electrode insulation film 100 may be made of any one material selected from electrically insulating thermoplastic, thermosetting and photocurable resins. Particular examples of the material include polyolefin resin, styrene butadiene resin, styrene resin, epoxy resin, urethane resin, acrylic resin, phenolic resin, amide-based resin, acrylate resin and modified resin thereof, but the material is not particularly limited, as long as it can perform the above-described functions.

Reference will be made to the contents known to date about the other detailed description of the insulation film.

Meanwhile, at least one electrode lead of the positive electrode lead 205 and the negative electrode lead 206 may be made of a metal substrate, but may include the metal substrate and a coating layer formed on the surface of the metal substrate.

Herein, the metal substrate may include at least one selected from the group consisting of nickel (Ni), aluminum (Al), copper (Cu) and stainless steel. Particularly, a preferred material for the metal substrate may be different depending on whether the electrode lead is a positive electrode lead or a negative electrode lead. For example, in the case of the positive electrode lead, the metal substrate may include aluminum, nickel or alloy containing at least one of them. In the case of the negative electrode lead, the metal substrate may include copper, nickel or alloy containing at least one of them.

Meanwhile, the coating layer is used to prevent the electrode lead from corrosion caused by a strong acid generated by the reaction between water infiltrating to the secondary battery and an electrolyte, while improving the adhesion between the electrode lead and the insulation film. For example, the coating layer may include a metal or metal oxide, and particularly, may include at least one selected from the group consisting of chrome (Cr), nickel (Ni), iron (Fe), molybdenum (Mo), silicon (Si), titanium (Ti), columbium (Cb), silicon oxide, tin oxide and titanium oxide.

Herein, the coating layer may have a thickness of 100 μm or less, particularly 30-100 μm, more particularly 30-80 μm, and most particularly 30-70 μm.

When the above-defined range is satisfied, it is possible to prevent the positive electrode lead and the negative electrode lead from corrosion caused by the strong acid generated inside of a secondary battery, while preventing an excessive increase in the thickness of the leads, preferably.

In addition, the coating layer may be formed by using a method well known to those skilled in the art with no particular limitation. For example, the coating layer may be formed by electroplating, or the like.

Although the battery casing is not particularly limited, it may be a pouch-type battery casing which allows suitable application of the above-described structure.

The constitution of the positive electrode, negative electrode, separator, positive electrode tab, negative electrode tab, battery casing, electrolyte, or the like, is known to those skilled in the art, and detailed description thereof will be omitted herein.

Meanwhile, in another aspect of the present disclosure, there is provided a method for manufacturing the secondary battery, including the steps of:

(a) preparing at least one positive electrode and at least one negative electrode each having a structure including an electrode active material layer formed on a current collector having a tab formed in at least one side thereof;

(b) interposing a separator between the positive electrode and the negative electrode;

(c) transferring a non-adhesive material to at least one of a positive electrode insulation film and a negative electrode insulation film through a roll pressing process by using a roll including the non-adhesive material corresponding to the shape of a vent portion, thereby forming a vent portion; and (d) connecting the positive electrode lead electrically to the positive electrode tab and connecting the negative electrode lead electrically to the negative electrode tab, and attaching the positive electrode insulation film and the negative electrode insulation film to the positive electrode lead and the negative electrode lead, respectively, wherein the vent portion is interposed between the positive electrode lead and the portion to which the positive electrode insulation film is attached, between the negative electrode lead and the portion to which the negative electrode insulation film is attached, or both.

Particularly, according to the present disclosure, the vent portion may be formed by a roll pressing process.

Figure 3:
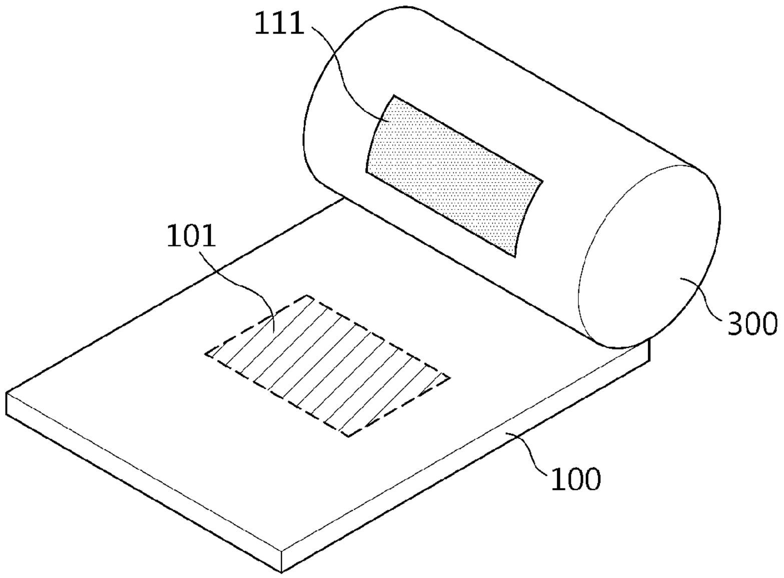
FIG. 3 is a schematic view illustrating a method for forming a vent portion according to still another embodiment of the present disclosure.

The method is shown schematically in FIG. 3.

Referring to FIG. 3, a roll 300 having a non-adhesive material 111 corresponding to the shape of a vent portion 101 formed on the surface thereof is used to carry out pressing so that the non-adhesive material 111 may be transferred to and coated on the surface of the insulation film 100, thereby forming a vent portion 101.

Herein, particular examples of the non-adhesive material 111 are the same as described above. In the drawing, the shape of the vent portion 101 is a rectangular shape. However, the vent portion may have a planar shape selected from a circular shape, an oval shape and a polygonal shape with no particular limitation.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A secondary battery comprising:

an electrode assembly comprising a positive electrode, a negative electrode and a separator interposed therebetween the positive electrode and the negative electrode, the electrode assembly being disposed in a battery casing with an electrolyte, the positive electrode comprises a positive electrode tab, and the negative electrode comprises a negative electrode tab, the positive electrode tab being connected electrically to a positive electrode lead, the negative electrode tab being connected electrically to a negative electrode lead, the positive electrode lead and the negative electrode lead extending through a sealing portion of the battery casing to outside the battery casing, a positive electrode insulation film being attached to a portion of the positive electrode lead contacting the sealing portion and a negative electrode insulation film being attached to a portion of the negative electrode lead contacting the sealing portion, and a vent portion with a non-adhesive material between the at least one of the positive electrode insulation film or the negative electrode insulation film and the corresponding positive electrode lead or the negative electrode lead at the portion where the positive electrode lead or the negative electrode lead is attached, wherein the vent portion is configured to provide an unadhered interface between the at least one of the positive electrode insulation film or the negative electrode insulation film and the corresponding positive electrode lead or the negative electrode lead for discharging gas through at least one of the positive electrode insulation film or the negative electrode insulation film.

2. The secondary battery according to claim 1, wherein the vent portion is a surface-treated coating layer including the non-adhesive material.

3. The secondary battery according to claim 1, wherein the non-adhesive material is a material cured after coating at least one polymer selected from the group consisting of a polyimide-based material, polytetrafluoroethylene and polymethyl pentene, or at least one ceramic particle selected from the group consisting of $SiO_2$, $TiO_2$, ZnO, CaO and BaO in a gelled state.

4. The secondary battery according to claim 1, wherein the vent portion has a planar shape selected from any of a circular shape, an oval shape and a polygonal shape.

5. The secondary battery according to claim 1, wherein at least one of the positive electrode lead and the negative electrode lead comprises a metal substrate and a coating layer formed on a surface of the metal substrate.

6. A method for manufacturing a secondary battery, the method comprising the steps of:

(a) preparing at least one positive electrode and at least one negative electrode each having a structure comprising an electrode active material layer formed on a current collector having a tab formed on at least one side thereof;

(b) interposing a separator between the positive electrode and the negative electrode;

(c) transferring a non-adhesive material to at least one of a positive electrode insulation film and a negative electrode insulation film through a roll pressing process by using a roll including the non-adhesive material corresponding to a shape of a vent portion, thereby forming the vent portion; and (d) connecting a positive electrode lead electrically to the positive electrode tab and connecting a negative electrode lead electrically to the negative electrode tab, and attaching the positive electrode insulation film and the negative electrode insulation film to the positive electrode lead and the negative electrode lead, respectively, wherein the vent portion is interposed at least between the positive electrode lead and the portion to which the positive electrode insulation film is attached or between the negative electrode lead and the portion to which the negative electrode insulation film is attached; and wherein the vent portion is configured to provide an unadhered interface between the at least one of the positive electrode insulation film or the negative electrode insulation film and the corresponding positive electrode lead or the negative electrode lead for discharging gas through at least one of the positive electrode insulation film or the negative electrode insulation film.

7. The method for manufacturing the secondary battery according to claim 6, wherein the non-adhesive material is a material cured after coating at least one polymer selected from the group consisting of a polyimide-based material, polytetrafluoroethylene and polymethyl pentene, or at least one ceramic particle selected from the group consisting of $SiO_2$, $TiO_2$, ZnO, CaO and BaO in a gelled state.

8. The method for manufacturing the secondary battery according to claim 6, wherein the vent portion has a planar shape selected from a circular shape, an oval shape and a polygonal shape.

* * * * *